United States Patent
Oh et al.

(10) Patent No.: US 11,224,916 B2
(45) Date of Patent: *Jan. 18, 2022

(54) METHOD OF PRODUCING A POWDER PRODUCT

(71) Applicant: Commonwealth Scientific and Industrial Research Organisation, Acton (AU)

(72) Inventors: Chull Hee Oh, Victoria (AU); Stefan Gulizia, Victoria (AU)

(73) Assignee: COMMONWEALTH SCIENTIFIC AND INDUSTRIAL RESEARCH ORGANISATION, Acton (AU)

(*) Notice: Subject to any disclaimer, the term of this patent is extended or adjusted under 35 U.S.C. 154(b) by 25 days.

This patent is subject to a terminal disclaimer.

(21) Appl. No.: 16/585,681

(22) Filed: Sep. 27, 2019

(65) Prior Publication Data

US 2020/0023439 A1 Jan. 23, 2020

Related U.S. Application Data

(63) Continuation of application No. 15/314,372, filed as application No. PCT/AU2015/000353 on Jun. 16, 2015, now Pat. No. 10,471,512.

(51) Int. Cl.
*B22F 9/04* (2006.01)
*C22C 14/00* (2006.01)
(Continued)

(52) U.S. Cl.
CPC .............. *B22F 9/04* (2013.01); *B02C 18/062* (2013.01); *B22F 1/0003* (2013.01); *B33Y 70/00* (2014.12); *C22C 14/00* (2013.01); *B22F 2009/042* (2013.01); *B22F 2009/045* (2013.01); *B22F 2301/205* (2013.01); *C22C 1/0458* (2013.01)

(58) Field of Classification Search
None
See application file for complete search history.

(56) References Cited

U.S. PATENT DOCUMENTS

| | | |
|---|---|---|
| 4,783,216 A | 11/1988 | Kemp, Jr. et al. |
| 4,923,533 A | 5/1990 | Shigeta et al. |

(Continued)

FOREIGN PATENT DOCUMENTS

| | | |
|---|---|---|
| EP | 1900421 | 3/2008 |
| GB | 666200 | 2/1952 |

(Continued)

OTHER PUBLICATIONS

U.S. Appl. No. 15/314,372, Final Office Action dated Apr. 12, 2019, 10 pages.

(Continued)

*Primary Examiner* — George Wyszomierski
(74) *Attorney, Agent, or Firm* — Kilpatrick Townsend & Stockton LLP

(57) ABSTRACT

A method of producing a powder suitable for additive manufacturing and/or powder metallurgy applications from a precursor particulate material comprising: subjecting the precursor particulate material to at least one high shear milling process, thereby producing a powder product having a reduced average particle size and a selected particle morphology.

17 Claims, 7 Drawing Sheets

(51) Int. Cl.
    *B02C 18/06*     (2006.01)
    *B33Y 70/00*     (2020.01)
    *B22F 1/00*     (2006.01)
    *C22C 1/04*     (2006.01)

(56) References Cited

U.S. PATENT DOCUMENTS

| | | | |
|---|---|---|---|
| 5,582,629 A | | 12/1996 | Nakai et al. |
| 5,632,596 A | * | 5/1997 | Ross .................. B01F 7/00758 |
| | | | 241/261 |
| 5,986,877 A | | 11/1999 | Pathare et al. |
| 6,000,840 A | * | 12/1999 | Paterson ................. B01F 7/164 |
| | | | 241/46.11 |
| 6,268,054 B1 | * | 7/2001 | Costantino .............. C09C 3/063 |
| | | | 428/403 |
| 7,441,717 B1 | * | 10/2008 | Majka ................... B02C 17/166 |
| | | | 241/15 |
| 10,471,512 B2 | * | 11/2019 | Oh ......................... B33Y 70/00 |
| 2006/0088783 A1 | | 4/2006 | Liu et al. |
| 2010/0247944 A1 | | 9/2010 | Mleczko et al. |
| 2012/0006922 A1 | | 1/2012 | Wilson et al. |
| 2015/0218388 A1 | | 8/2015 | Rupprecht et al. |
| 2018/0044806 A1 | * | 2/2018 | Deane .................. B22F 1/0048 |

FOREIGN PATENT DOCUMENTS

| | | |
|---|---|---|
| JP | 61259739 | 11/1986 |
| JP | 07278612 | 10/1995 |
| JP | 08109406 | 4/1996 |
| JP | 09118904 | 5/1997 |
| JP | 2000509103 | 7/2000 |
| JP | 2005281761 | 10/2005 |
| WO | 9740199 | 10/1997 |
| WO | 0071256 | 11/2000 |
| WO | 2014029779 | 2/2014 |

OTHER PUBLICATIONS

U.S. Appl. No. 15/314,372, Non-Final Office Action dated Apr. Oct. 1, 2018, 10 pages.
U.S. Appl. No. 15/314,372, Notice of Allowance dated Apr. Jul. 22, 2019, 9 pages.
International Application No. PCT/AU2015/000353, International Search Report and Written Opinion dated Aug. 12, 2015, 9 pages.
European Application No. 15 809 330.2-1103, "Office Action", dated Mar. 21, 2020, 6 pages.

\* cited by examiner

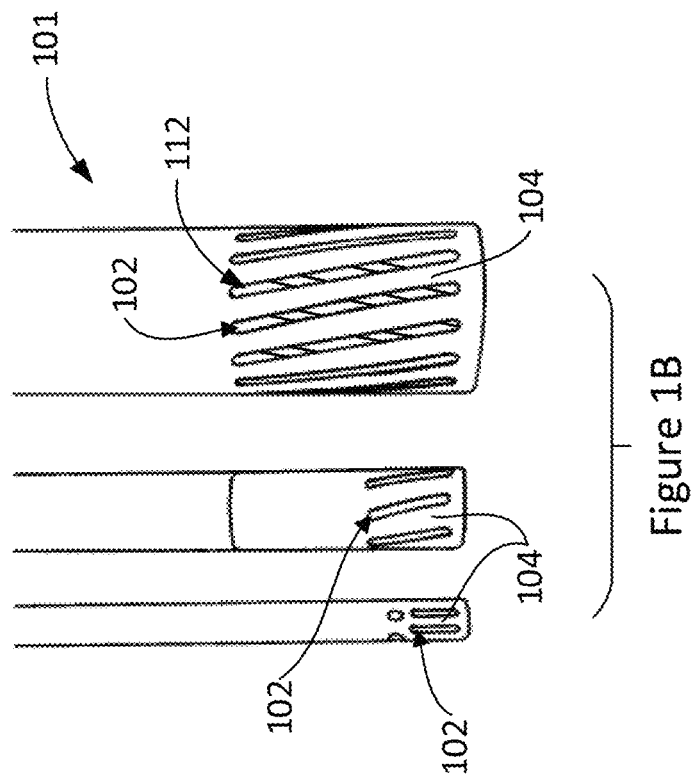
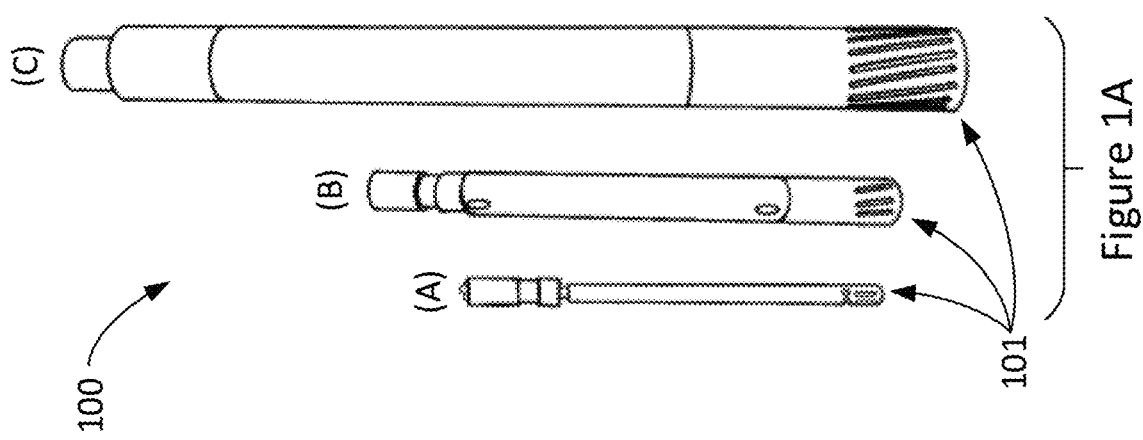

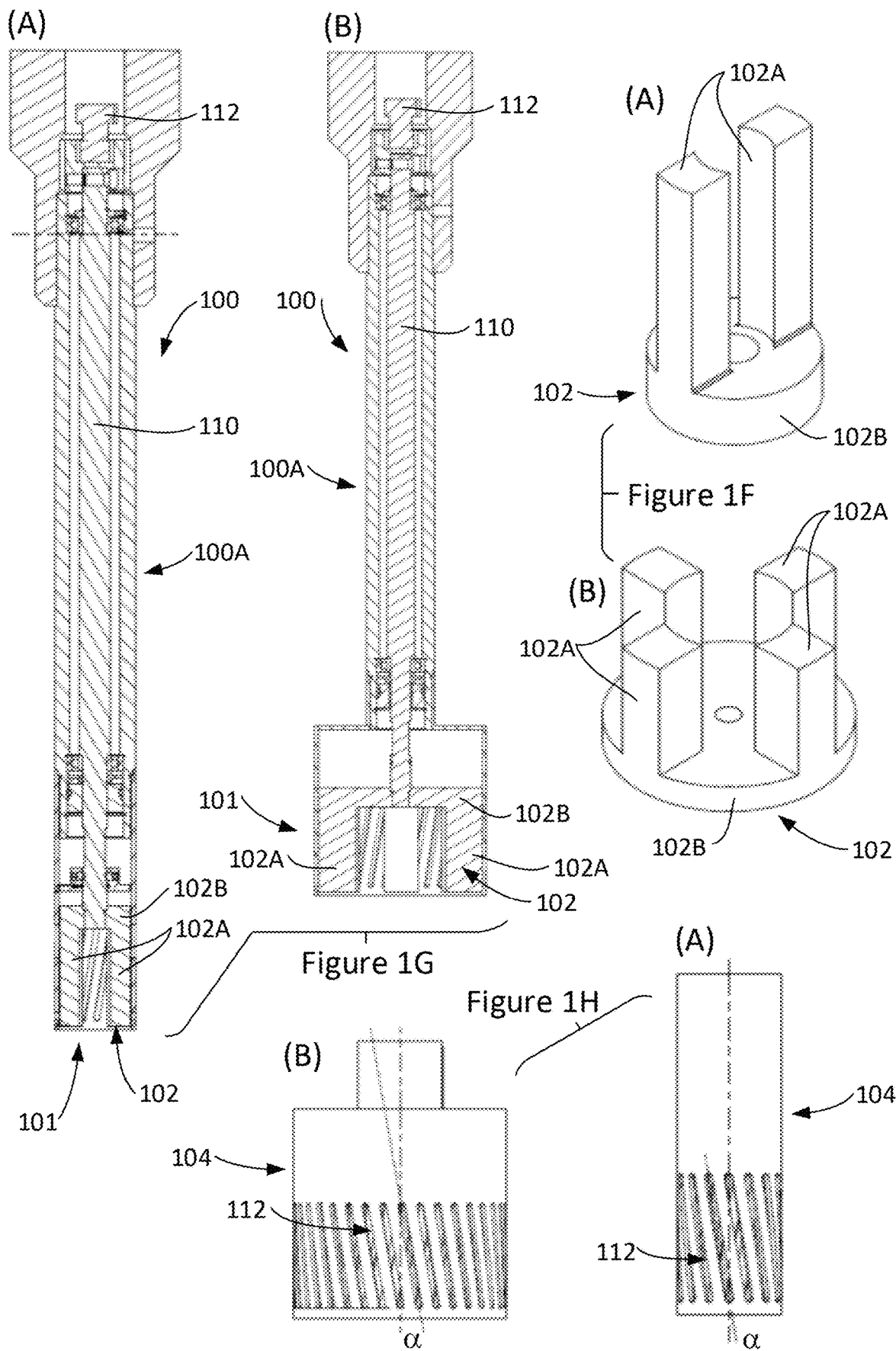

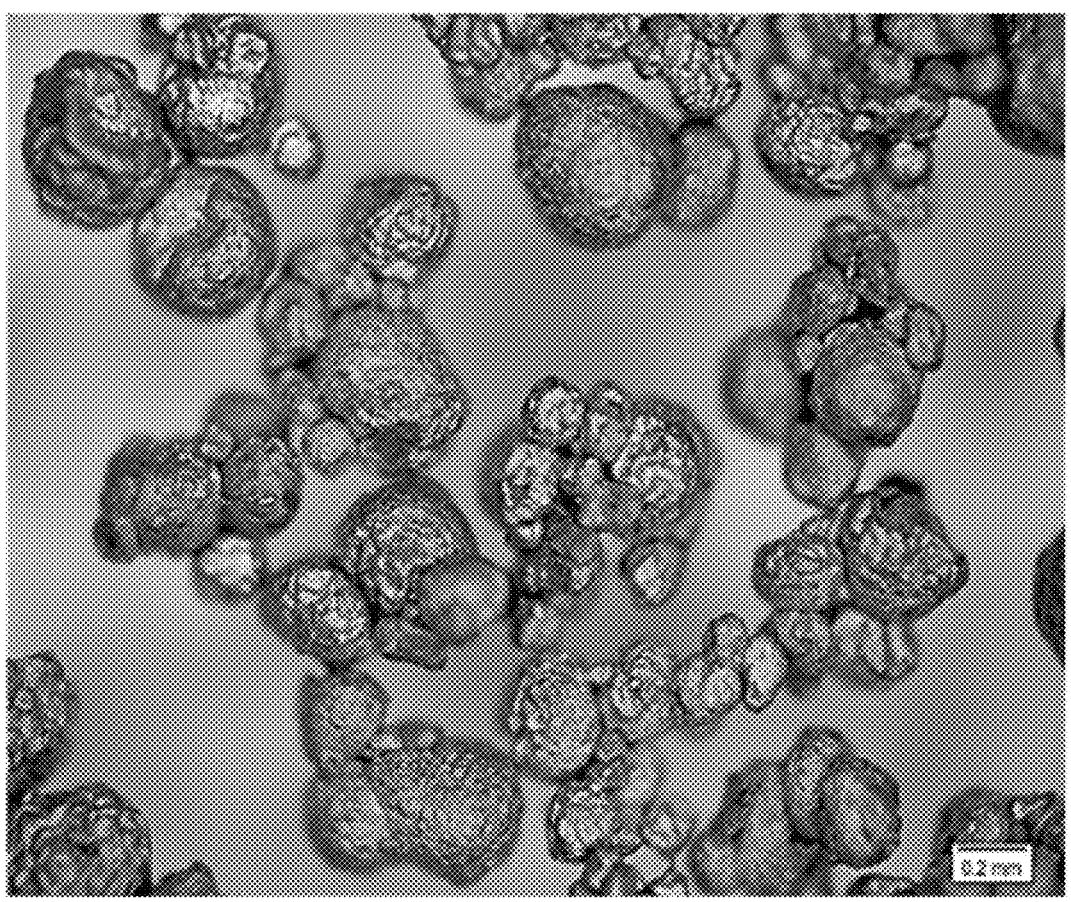
Figure 4
Figure 5
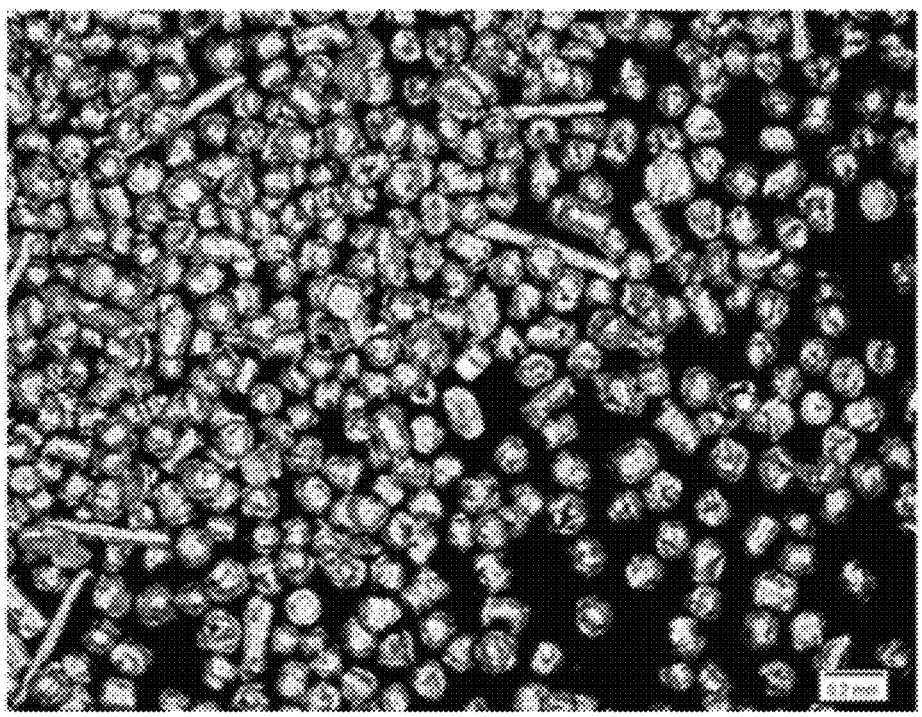

METHOD OF PRODUCING A POWDER PRODUCT

CROSS REFERENCE TO RELATED APPLICATIONS

This application is a continuation of U.S. Ser. No. 15/314,372, filed Nov. 28, 2016, which is a U.S. National Stage of International Application No. PCT/AU2015/000353, filed Jun. 16, 2015, which claims the benefit of Australian patent Application No. 2014902291, filed Jun. 16, 2014, the entire contents of which are incorporated herein by reference.

TECHNICAL FIELD

The present invention generally relates to a method of producing a powder product from a precursor material. The invention is particularly applicable for producing a powder product suitable for additive manufacturing processes such as electron (laser) beam melting or cold spray deposition, or for powder metallurgy applications, and it will be convenient to hereinafter disclose the invention in relation to those exemplary applications. However, it is to be appreciated that the invention is not limited to that application and the powder product could be used in any number of applications and products in which a desired powder morphology and size is required.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Metal powders having a specific particle size and morphology are required for direct (additive) manufacturing processes such as cold spray, electron (laser) beam melting or continuous direct powder rolling processes. For example, titanium/titanium alloy powder used in electron (laser) beam melting preferably has a particle size of less than 250 µm with a narrow particle size distribution range. The particles are also required to have a regular morphology, such as spherically or cylindrically shaped powder particles, in order to provide high flowability.

Existing commercial titanium/titanium alloy powder production processes include hydride-de-hydride (HDH), gas atomization (GA), plasma-rotating electrode and plasma atomization (PREP) processes. Each of these processes requires the production of a solid Ti or Ti alloy feedstock product, such as a wire, bar, rod or billet, which is subsequently processed using brittle fracture, atomization, arcing or the like to produce the powder.

In the hydride-de-hydride process, solid Ti or Ti alloy feedstock are processed to remove contaminants, hydrogenated to produce brittle material and then ground under argon in a vibratory ball mill. The resulting particles are angular and measure between 50 and 300 µm. This process is time consuming, can introduce contamination, and produces particles having a sharp angular shaped morphology which are not favourable for additive manufacturing processes. In contrast, fine powders produced by plasma-rotating electrode and plasma atomization or gas atomisation methods are spherically shaped, but are extremely expensive to produce compared to hydride-de-hydride processed metal or metal alloy powders due to the high temperatures used to atomize the metal in these processes. Significant metal loss can also result from such process conditions.

It would therefore be desirable to provide an alternate method of producing a powder, preferably a powder having a desired morphology and size, suitable for additive manufacturing applications.

SUMMARY OF THE INVENTION

The present invention provides in a first aspect a method of producing a powder from a precursor particulate material comprising:

subjecting the precursor particulate material to at least one high shear milling process, thereby producing a powder product having a reduced average particle size and a selected particle morphology, preferably suitable for additive manufacturing and/or powder metallurgy applications.

The present invention provides a novel powder manipulation method for producing a powder from a precursor particulate material. The precursor particulate material is subjected to a high shear milling process to produce a powder having selected properties. The method produces a powder, preferably a metal powder, with a desirable powder morphology, particle size and particle size distribution (PSD) without the need for plasma-rotating electrode and plasma atomization, gas atomisation or hydride-de-hydride routes. The powder product is preferably processed to a suitable morphology and particle size for use as raw materials for the additive manufacturing (AM) processes, such as (but not limited to) Arcam & cold spray, or for other consolidation processes such as powder metallurgy (PM).

The method of the present invention has been developed primarily for titanium/titanium alloys powders. However, it should be appreciated that the method of the present invention can be used for shaping and sizing other metal powders for additive manufacturing and powder metallurgy applications. Examples of other suitable particulates and powders include ductile (e.g. aluminium, magnesium, copper, zinc etc.) or porous metal/metal alloy particulates.

The powder product is processed by the method of the present invention to preferably produce a powder product that has at least one of: high flowability; high apparent/tap density; and low contamination, and preferably each of these properties.

With respect to flowability, it is preferred that the flowability of the powder product, and in particular Ti/Ti alloy powders, is improved from non-flowable to at most 35 seconds/20 $cm^3$, preferably at most 25 seconds/20 $cm^3$, more preferably at most 23 seconds/20 $cm^3$, yet more preferably between 20 seconds/20 $cm^3$ and 23 seconds/20 $cm^3$. Similarly, in some embodiments the apparent/tap density of the powder product is improved at least by 100%, preferably by >120%.

With respect to contamination, it is preferred that the powder product is not contaminated with compounds or elements distinct/different from the desired metal or metal alloy (or combination thereof). In some embodiments, the powder product to be at least 99% pure, more preferably at least 99.5% pure.

In an exemplary application, the process is used to produce a powder product having a suitable morphology and particle size for use as raw materials for additive manufacturing (AM) processes or for other consolidation processes such as powder metallurgy (PM). In such applications, the process of the present invention mills the precursor particulate material to a powder to optimise the following powder characteristics: a high production yield of desired particle size in the produced powder; having high flowability; and having high apparent/tap density. It is also preferred for the powder product to have a low contamination. It should be appreciated that the ranges for these factors preferably fall within the values defined above.

The morphology and physical properties of precursor particulate material including that material's porosity and hardness affects the morphology, reduction of particle size and yield of the powder with desired particle size product. Fine powder production yields by high shear milling of harder and denser particulates are lower than that of softer and more porous particulates. Thus, where precursor particulate material are dense and hard, the milling yield may be significantly reduced compared to porous of soft particulate material.

Notwithstanding the above, the precursor particulate material can comprise any suitable starting material. In some embodiments, the precursor particulate material comprises a coarse particulate material. In some instances, the precursor material comprises, irregularly shaped particulates, which may be porous. The precursor material is preferably a metal, metal alloy or mixture thereof. Examples of precursor materials include Ti particulates produced from a Ti manufacturing process, such as Ti sponge or particulates produced from the Kroll process, or the Armstrong process. Another suitable precursor particulate material is the particulate or powder product produced from the TIRO process as detailed in international patent publication No. WO2006/042360A1 and international patent publication No. WO2011/137489A1, of which the contents of each should be taken as being incorporated into the present specification by the above references.

In some embodiments, the precursor particulate material comprises a porous or soft particulate material. For example, CP grade titanium is softer than most titanium alloys (for example $TiAl_6V_4$). Therefore, high shear milling of CP grade titanium sponge will typically produce more fine and spherical shaped powder than high shear milling of most titanium alloys.

The precursor particulate material typically has a particle size distribution which is unsuitable for additive manufacturing processes or for powder metallurgy applications. The process of the present invention is therefore used to reduce the average particle size of the precursor particulate material. In some embodiments, the reduced particle has a particle size distribution in which at least 80%, preferably 90% of the particles have an average particle size <500 µm. In some embodiments, the precursor particulate material has a particle size distribution in which at least 80%, preferably 90% of the particles have an average particle size <250 µm. In some embodiments, at least 90%, preferably at least 95%, more preferably at least 99% of the particles have an average particle size <300 µm, preferably <250 µm, and more preferably <150 µm. In some embodiments, the above average particle size results for application of the process of the present invention to 8 mm precursor particulates.

It should be appreciated that the size of precursor particulate material which can be subjected to a high shear milling process is dependent a number of factors. The maximum size of particulates is related to the size of rotor used in the high shear mill process and also the morphology and the physical properties of particulates, including porosity, hardness and ductility. For example, the maximum particle size processable in a high shear milling process having a high shear milling device with a 15 mm diameter rotor would be about 10 mm diameter, where that precursor particulate material was a relatively porous particulate material. However, where that material has a suitably high porosity, it may be possible to process >10 mm particulates. Exemplary porosities of the precursor particulate which assist high shear milling would be preferably >10%.

If the size of particulates is too large for high shear milling, then the particulates can be broken into smaller pieces by another comminution process prior to the high shear milling process. In such embodiments, the precursor particulate material may be subject to one or more pre-processing stage prior to undergoing the high shear milling process. These pre-processing stages include one or more comminution processes including crushing, grinding, milling or the like. In some embodiments, the pre-processing stages include the use of at least one of jaw crusher, cone crusher, hammer crusher, ball mill, vertical ring mill, roller mill, hammer mill, roller press, vibration mill, jet mill, press, or the like.

The high shear milling process of the present invention preferably modifies the particle morphology of the precursor particulate material from an irregular shape to powder product having a substantially uniform shaped particle such as (but not limited to) angular, platelet, spherical, rod or cylindrical shaped particles. In some embodiments, the particle morphology of the powder product comprises a substantially regular shaped particle, such as (but not limited to) spherical, rod or cylindrical shaped particles.

It should be appreciated that the morphology of the powder product is dependent on and can be controlled by changing the shear milling process conditions including at least one of shear milling rotor speed; shear milling time; or amount of precursor powder. For example, a precursor particulate material which is subject to a high shear milling process with higher milling speeds and/or longer milling times compared to another high shear mill process would typically include a higher proportion of spherical shape morphology.

Furthermore, the critical mass of powder also contributes to a change of powder morphology to spherical shape during high shear milling, because the collisions between powder particles and/or between powder particles and stator during the milling process contribute to morphology change of the processed powder.

The reduced average particle size of the powder product is a result of comminution of the precursor particulate material by the high shear milling process. The particle size range which is produced by the high shear milling depends on milling conditions and the properties of particulates. The fine powder produced by the high shear milling process preferably has a particle size range in which has a particle size range in which at least 90%, preferably at least 95%, more preferably at least 99% of the particles have an average particle size <250 µm. In some embodiments, the fine powder produced by the high shear milling process has a particle size range in which has a particle size range in which at least 90%, preferably at least 95%, more preferably at least 99% of the particles have an average particle size <250 µm, and preferably <150 µm. In some embodiments, the particle size range of <250 µm is preferably >90%, and more preferably >95%. In some embodiments, the particle size ranges between 45 and 106 µm would be >40%, and preferably >80%. Milling yield of metal powder depends on physical property of the precursor particulates. For example, high shear milling of a highly porous titanium sponge produced from the Kroll, Armstrong and TIRO processes can in some embodiments result in a >95% production yield of sub-30 micron powder.

The high shear milling process of the present invention preferably includes at least one high shear milling device. A high shear milling device typically includes milling head which includes a rotatable rotor or impeller housed within a stator. The stator comprises a stationary cover or cage, preferably having a series of diagonal slots, which surrounds and encloses the rotor. The slots are preferably angled between 5 and 30 degrees to/from the central longitudinal axis of the stator, more preferably between 5 and 20 degrees, yet more preferably between 7 and 12 degrees, and in some embodiments about 10 degrees to the central longitudinal axis of the stator. The slots can have any suitable dimension. In one embodiment, the slots have are 3 mm wide and 50 mm long. In operation, the milling head is brought into contact with the precursor particulates and the rotor (in combination with the stator) contacts and comminutes the precursor particulate material through shear and other mechanical forces. In some embodiments, the precursor particulate material is immersed in a liquid during the high shear milling process. This reduces the dust produced during the high shear milling process, improves the safety and reduces the risk of dust related explosion. The liquid preferably comprises at least one of water, alcohol kerosene or other liquids.

Many high shear milling conditions were examined by the inventors to optimise the desired powder characteristics. Whilst not wishing to be limited to any one parameter, it was found that some important parameters affecting high shear milling processes include:

Milling speed, i.e. circumferential speed of a rotor (m/min, circumference of the rotor× rotational speed (RPM)). Higher milling speeds produce more fine particles. In some embodiments, the milling speed (circumferential speed of the rotor) is at least at least 700 m/min, preferably at least 1200 m/min, and more preferably at least 2500 m/min.

Duration of milling: Longer milling times produce more fine particles. In some embodiments, the duration of high shear milling of precursors which are produced by the Kroll, the Armstrong or TIRO processes (to produce maximum amount of 45-150 μm milled powder) is at least 5 minutes, more preferably at least 20 mins, and yet more preferably at least 30 mins. In order to produce maximum amount of <45 μm milled powder, it would need more preferably longer than 30 mins.

Batch amount: Milling smaller batch masses result in more fine particles.

Rotor size: Larger rotor size produce more fine particles due to higher circumferential speed for a given milling speed (RPM). In some embodiments, the rotor has a rotor diameter, and the precursor particulate material comprise particles having an average particle size of less than the rotor diameter, preferably less than 80% the rotor diameter, preferably less than 75% the rotor diameter, and yet more preferably less than 50% of the rotor diameter.

Number of high shear mills in a milling: a larger number of high shear mills produce more fine powder (e.g. high shear milling of titanium powder with two or more high shear mills produces more fine powder than when milling with one high shear mill). In some embodiments, the high shear milling process includes at least two high shear mills so as to produce more fine powder.

Gap distance between rotor and inside wall of stator: Smaller gap distance between a rotor and milling stator casing produce more fine particles. In some embodiments the shear mill includes a stator which extend substantially around the rotor, the stator being configured to have less than 5.0 mm gap between the rotor (preferably the distal end of the rotor blade) and the inner surface of the stator casing, preferably less than 2.0 mm gap, more preferably less than 1.0 mm gap, and yet more preferably less than 0.8 mm gap. In some embodiments, the gap is between 0.2 and 0.8 mm, preferably between 0.4 and 0.6 mm, more preferably about 0.4 mm.

Morphology and physical properties of particulates, as discussed above.

In a second aspect, the present invention provides a method of producing a powder for additive manufacturing and/or powder metallurgy applications from a precursor particulate material comprising:

subjecting the precursor particulate material to at least one high shear milling process, thereby producing a powder product having a reduced average particle size and a particle morphology suitable for additive manufacturing and/or powder metallurgy applications comprising a substantially uniform shaped particle selected from at least one of angular, platelet, spherical, rod or cylindrical shaped particles.

It is to be understood that this second aspect of the present invention can include the above defined features of the first aspect of the present invention.

In a third aspect, the present invention provides a powder of particulate material produced from a method according to the first aspect of the present invention.

BRIEF DESCRIPTION OF THE DRAWINGS

The present invention will now be described with reference to the figures of the accompanying drawings, which illustrate particular preferred embodiments of the present invention, wherein:

FIGS. 1A and 1B illustrates two shear milling devices used in the shear milling process according to an embodiment of the present invention in which the devices comprise (A) 7.4 mm diameter rotor and 10 mm diameter stator; (B) 15 mm diameter rotor and 20 mm diameter stator and (C) 35.2 mm diameter rotor and 40 mm diameter stator.

FIG. 1F provides isometric views of rotor configurations that can be used in the shear milling devices shown in FIGS. 1A and 1B, comprising (A) 35.2 mm diameter rotor and 40 mm diameter stator, and B) 95.2 mm diameter rotor and 100 mm diameter stator.

FIG. 1G provides cross-sectional view of two shear milling devices used in the shear milling process according to an embodiment of the present invention, comprising (A) 35.2 mm diameter rotor and 40 mm diameter stator, and B) 95.2 mm diameter rotor and 100 mm diameter stator.

FIG. 1H provides a front view of the stators of the two shear milling devices shown in FIG. 1G, comprising (A) 40 mm diameter stator, and B) 100 mm diameter stator.

FIG. 4 provides an optical micrograph of Ti precursor particulates (Ti-6a) used in one embodiment of the process of the present invention.

FIG. 5 provides an optical micrograph of one product Ti powder particle produced after high shear milling the precursor Ti particles as shown in FIG. 4, in accordance with one embodiment of the process of the present invention.

DETAILED DESCRIPTION

The present invention relates to powder manipulation method for producing a powder from a precursor particulate material. The present invention is preferably used to produce cost effective, fine and highly flowable metal powders with minimum contamination by manipulating a coarse particulate precursor material which has a large particle size and irregularly shaped particles.

In the process of the present invention, a precursor particulate material is subjected to a high shear milling process to produce a powder having selected properties. In one exemplary application, the powder product is processed to a suitable morphology and particle size for use as raw materials for the additive manufacturing (AM) processes or for other consolidation processes such as powder metallurgy (PM).

It should be appreciated that the inventors of the present invention considered a large number of comminution processes for comminuting a coarse particular precursor material into a powder product having the desired particle size and morphology suitable for additive manufacture and other powder metallurgy application. The properties of high shear milled titanium powder were:

- a high production yield of <150 μm size powder;
- high flowability of 23 to 35 seconds/20 cm$^3$ (from non flowable precursor particulates);
- apparent/tap density of high shear milled powder are improved at least by more than 100%; and
- low contamination of less than 1%, resulting in a product powder purity of at least 99%.

A number of crushing, grinding and pressing processes were considered by the inventors to provide the above desired powder properties from a precursor particulate material. None of these processes were found to provide the required powder product properties. Despite the shortcomings of these and other similar comminuting processes, the inventors found that the application of a high shear milling process to the same precursor particulate material provided a powder product having the desired processes. High shear milling processes and conditions were then investigated in order to optimise the process to produce the powder product and morphology and average particle size characteristics required for additive manufacturing (AM) processes and other powder consolidation processes such as powder metallurgy (PM).

Figure 1C:
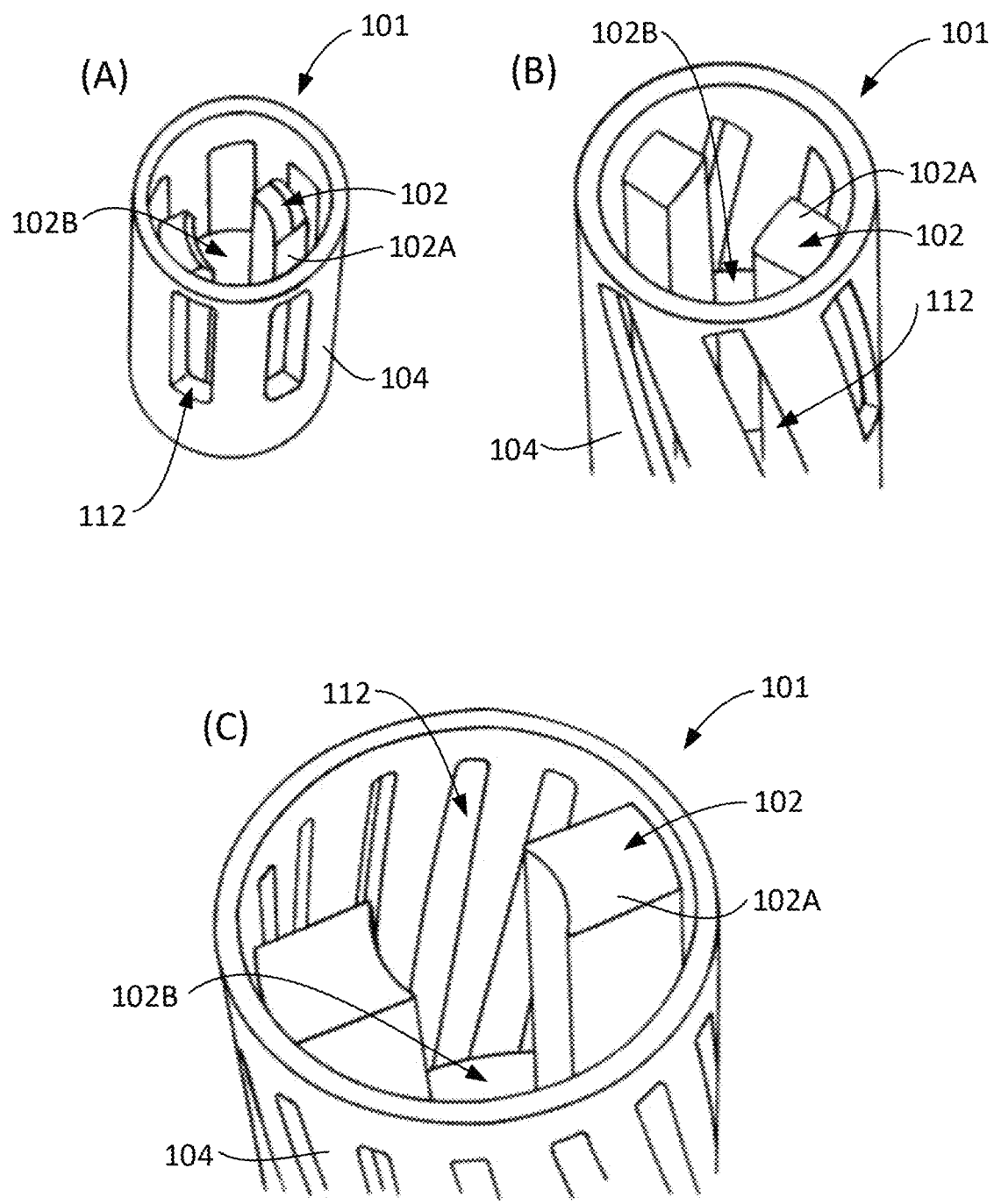
FIG. 1C illustrates the rotor configurations of the shear milling devices shown in FIGS. 1A and 1B comprising (A) 7.4 mm diameter rotor and 10 mm diameter stator; (B) 15 mm diameter rotor and 20 mm diameter stator and (C) 35.2 mm diameter rotor and 40 mm diameter stator.

One type of high shear milling device used in the process of the present invention is shown in FIGS. 1A, to 1H. Three different sized shear milling devices are illustrated in FIGS. 1A to 1C comprising (A) 7.4 mm diameter rotor and 10 mm diameter stator (or milling shaft); (B) 15 mm diameter rotor and 20 mm diameter stator and (C) 35.2 mm diameter rotor and 40 mm diameter stator. The high shear milling device used in the present invention can be sourced from a variety of manufacturers. However, in the particular illustrated embodiments, three devises are shown in FIGS. 1A and 1B, namely (A) Small device (10 mm diameter stator) and (B) medium device (20 mm diameter stator) High Shear Mill are high shear mixing/milling devices from Ystral GmbH, 1020 type (220V, 1.25 A, 50 Hz, 260 W, Max: 25000 rpm). Furthermore, (C) the large device (40 mm diameter) is a high shear mixing/milling device from from Ystral GmBH, comprising 40/38E3 type (230V, 8.2 A, 50-60 W, 1800 W, Max: 23500 rpm).

Figure 2:
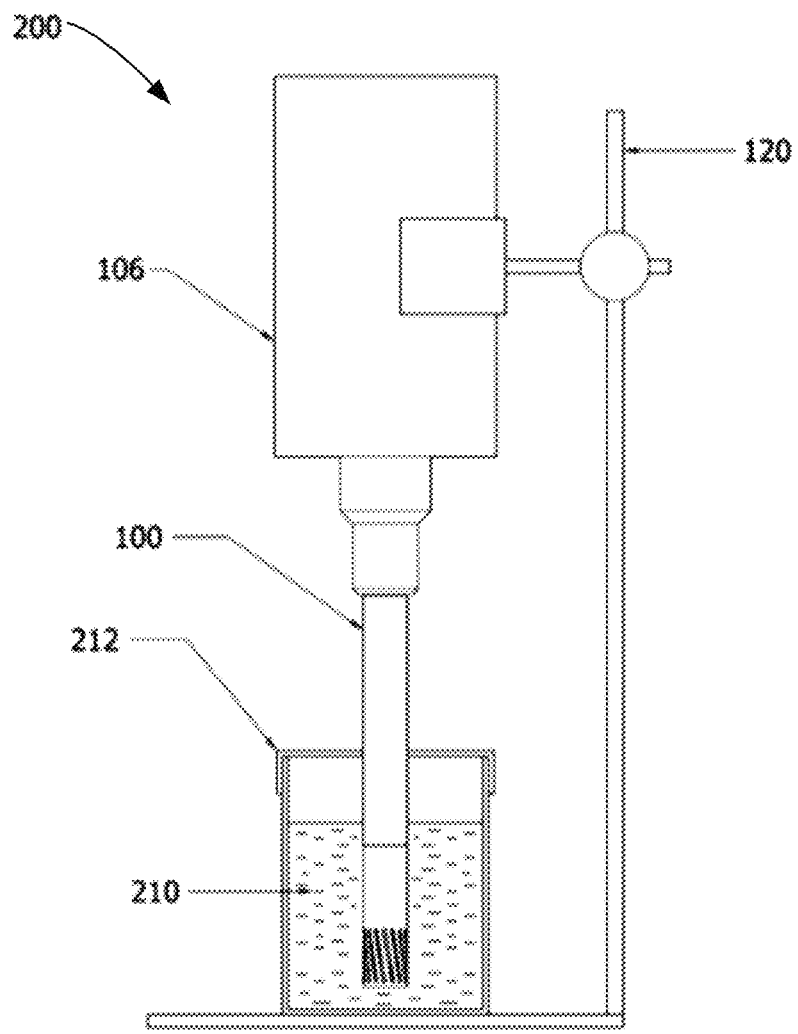
FIG. 2 illustrates the experimental set up of one shear milling process according to an embodiment of the present invention incorporating at least one of the shear milling devices shown in FIGS. 1A and 1B.

The illustrated high-shear mill devices 100 comprise a milling shaft 100A and a milling head 101 having a stator 104 and a rotatably driven rotor or impeller 102 enclosed within the stator 104. As best illustrated in FIGS. 1A and 1B, each stator 104 comprises a cage with a series of diagonal thin slots which is seated around the rotating rotor, through which material is drawn and engages through contact and rotation forces of the rotor 102. For the illustrated embodiment shown in FIGS. 1A(C) and 1B(C), the stator 104 has a diameter of 40 mm, internal diameter of about 36 mm and includes 16 equispaced slots 112 which are 3 mm wide and 50 long comprising apertures which penetrate through the wall of the stator 104. Each slot 112 is angled about 10 degrees from the axial axis running through the length of the stator 104. The 36 mm internal diameter of the stator 104 provides around 0.4 mm gap between the outer edge of the rotor 104 and inner wall of the stator 104. The stator 104 is preferably constructed from high tensile steel, for example 4340 high tensile steel. The rotor 102 is driven by a motor 106, in the illustrated case the motor is an electric motor, though it should be appreciated that any suitable driver or motor could be used. The high-shear mill device 100 is typically immersed in a tank or other receptacle 210 containing the material to be milled, as shown in FIG. 2.

The rotor 102 can have a large variety of suitable configurations. FIGS. 1C and 1G shows the rotor 102 configuration in detail. In this Figure, each of these rotors 102 has two or four spaced apart rotor blades 102A set on a drive disc 102B. With reference to the high shear milling devices shown in FIGS. 1A and 1B, the rotor 102 has two blades 102A for each of these embodiments (rotor 102 having diameters 7.4 mm, 15 mm, 35.2 mm). A four blade rotor 102 is preferably used on larger diameter rotors, for example a rotor having a 95.2 mm diameter, such as shown in FIG. 1G(B). It should be appreciated that the rotor blades 102A rotate through rotation of drive disc 102B, impacting material which is drawn into the stator 104.

Figure 1D:
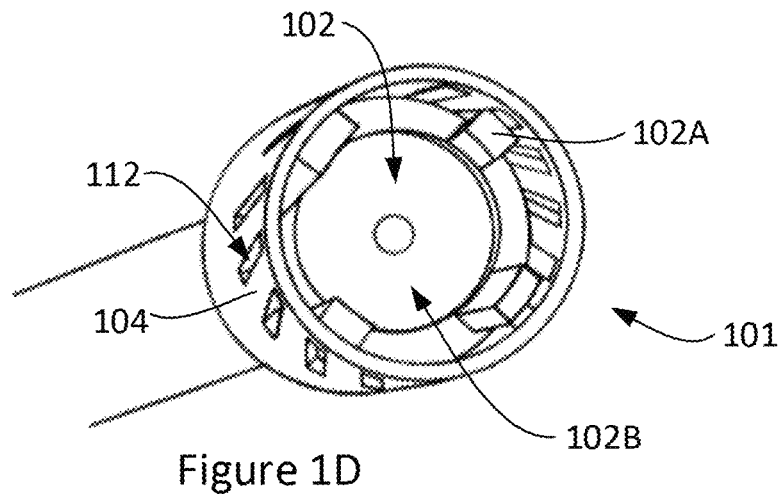
FIGS. 1D and 1E illustrates two alternate rotor configurations that can be used in the shear milling devices shown in FIGS. 1A and 1B.
Figure 1E:
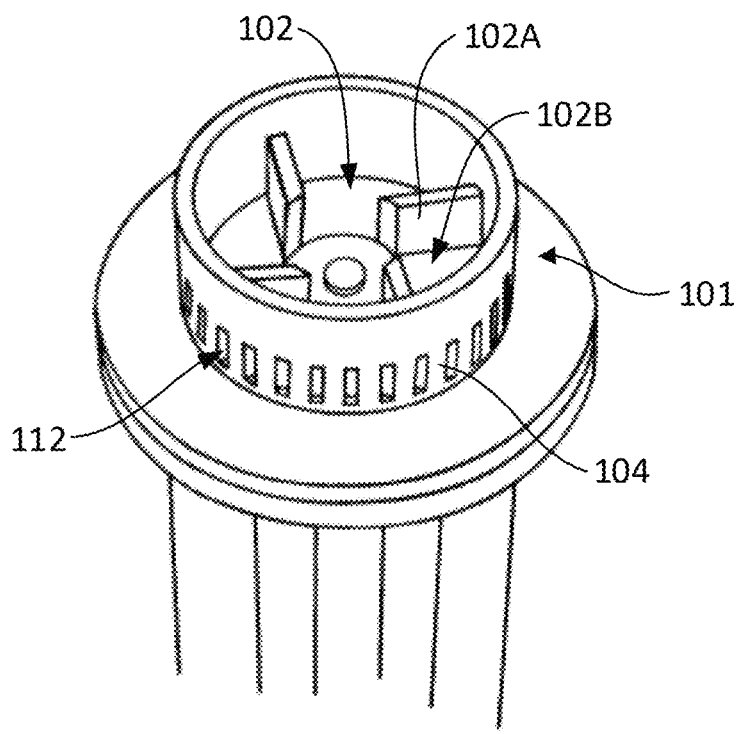

Two alternate configurations used in the milling heads 101 of the high shear milling device shown in FIGS. 1A and 1B are shown in FIGS. 1C and 1D. Each of these rotors 102 has four spaced apart rotor blades 102A set on a drive disc 102B. Again, it should be appreciated that the rotor blades 102A rotate through rotation of drive disc 102B, impacting material which is drawn into the stator 104. It should be appreciated that other rotor configurations can be used having a different number of rotor blades, blade configurations and the like.

FIGS. 1G and 1H provides a cross-sectional view of two embodiments of the shear milling devices used in the shear milling process according to an embodiment of the present invention. As shown in FIG. 1F these embodiments have (A) 35.2 mm diameter rotor 102 and 40 mm diameter stator 104, and B) 95.2 mm diameter rotor 102 and 100 mm diameter stator 104. The particular rotors 102 of these devices are illustrated in FIG. 1G. As described above, the rotor 102 comprises two or four spaced apart rotor blades 102A set on a drive disc 102B. The rotor 102 in FIG. 1F(A) comprises a two blade rotor 102 where the blades 102A are position 180 degrees apart. Each blade 102A extends relative to the central axis between R8 mm and R17.6 mm (i.e. the out radius of the rotor 102). Each blade 102A is 10 mm wide and 60 mm long (measured from the base side of drive disc 102B). However, it should be appreciated that any suitable dimensions could be used for a specific application, and the invention should not be restricted to this particular exemplified configuration. The rotor 102 in FIG. 1F(B) comprises a four blade rotor 102 where the blades 102A are position 90 degrees apart. Each blade 102A extends relative to the central axis between R26 mm and R47.6 mm (i.e. the out radius of the rotor 102). Each blade 102A is 20 mm wide and 60 mm long (measured from the base side of drive disc 102B. However, it should be appreciated that any suitable dimensions could be used for a specific application, and the invention should not be restricted to this particular exemplified configuration. Each rotor 102 is operatively connected to drive shaft 110, which in turn is connected to shaft coupler 112, which (whilst not illustrated) is operatively connected to a motor. Operation of the motor drives rotation of drive shaft 110, which in turn rotates the rotor 102 within the stator 104.

Moreover, as shown in FIG. 1H, the stators 104 of each of these embodiments comprise cylindrical cages have the following configurations:
(A) FIG. 1H(A) shows a stator 104 having a diameter of 100 mm having 16 equispaced slots 112 which are 3 mm wide and 50 long comprising apertures which penetrate the wall. Each slot 112 is angled about 10 degrees from the axial axis running through the length of the stator. This stator 104 has a 36 mm internal diameter which provides around 0.4 mm gap between the outer edge of the rotor 104 and inner wall of the stator 104. The illustrated stator 104 is 130 mm long (along axial length). Though it should be appreciated that this length could be any length as long as the rotor 102 is enclosed within the stator 104.
(B) FIG. 1H(B) shows a stator 104 having a diameter of 100 mm having 36 equispaced slots 112 which are 3 mm wide and 50 long comprising apertures which penetrate the wall. Each slot 112 is angled about 10 degrees from the axial axis running through the length of the stator. This stator 104 has a 96 mm internal diameter which provides around 0.4 mm gap between the outer edge of the rotor 104 and inner wall of the stator 104. The illustrated stator 104 is 96 mm long (along axial length). Again, it should be appreciated that this length could be any length as long as the rotor 102 is enclosed within the stator 104.

Again, each stator 104 is preferably constructed from high tensile steel, for example 4340 high tensile steel.

Without wishing to be limited to any one theory, a fluid (in this case with the precursor particles) flows into the bottom opening of the stator 104 and flows out through the slots 112 and undergo shear when one area of that fluid travels with a different velocity relative to an adjacent area. A high-shear mill device 100 therefore uses the high-speed rotor 102 to create flow and shear, resulting in comminution and deformation of the particles flowing through and around the rotor 102 and stator 104. The tip velocity, or speed of the fluid at the outside diameter of the rotor 102 is higher than the velocity at the center of the rotor 102, and it is this velocity difference that creates shear. The stator 104 creates a close-clearance gap between the rotor 102 and itself and forms an extremely high-shear zone for the material as it exits the rotor 102.

As shown in FIG. 2, a high shear milling apparatus 200 (in this case an experimental, laboratory apparatus) comprises the high shear mill device 100 installed and clamped in place on a stable stand 120 with the mixing head 101 inserted into a mixing container, in the illustrated case, jar 210. The jar 210 includes a cover 212 to seal the precursor particulates and powder product within the jar 210. As the process of the present invention concerns milling a particulate material into a powder, the precursor particulates are immersed in a fluid, typically one of water, an alcohol, or kerosene, when milled within the jar 210, to reduce the production of fine dust during milling. This reduces the dust produced during the high shear milling process, improves the safety and reduces the risk of dust related explosion.

In operation, the milling head 101 is brought into contact with the precursor particulates and the rotor 102 in combination with the stator 104 of the milling head 101 contacts and comminutes the precursor particulate material through shear and other mechanical forces as described above.

It should be appreciated that persons skilled in the art would understand that the laboratory scale device 100 and apparatus 200 shown in FIGS. 1A, 1B and 2 could be scaled up to an industrial scale using for example larger high shear milling devices, and a number of parallel or series arranged devices.

As can be appreciated, a number of design factors can affect the high shear milling process include the diameter of the rotor and its rotational speed, the distance between the rotor and the stator, the duration of milling, and the number of high shear milling devices used. These factors and other properties of the process of the present invention will be demonstrated in the following examples:

EXAMPLES

The method of the present invention has been developed primarily for titanium/titanium alloys powders, and as such the following examples demonstrate that particular application. However, it should be appreciated that the method of the present invention should not be limited to that application can be used for shaping and sizing other metal powders for additive manufacturing and powder metallurgy applications.

Example 1—High Shear Milling Results as a Function of Milling Speed (rpm)

High shear milling yields were examined as a function of mixing speed (mixer rpm) to determine the effect of mixing speed on particle size reduction and particle size distribution.

Method

A laboratory scale, bench top high shear milling apparatus 200 (as shown in FIG. 2) was used to mill 30 g batches of Ti particulates. The details of the specimens for the Ti-1 titanium powder experimental runs are provided in Table 1.

TABLE 1

Details of the batches

| Milling conditions | Milling speed (rpm) | Milling time (minutes) | Sample designation |
|---|---|---|---|
| Batch: 30 g Ti particulates (<8 mm) Milling liq: Water, 300 g | As-received (before milling) | 0 | Ti-1 |

TABLE 1-continued

Details of the batches

| Milling conditions | Milling speed (rpm) | Milling time (minutes) | Sample designation |
|---|---|---|---|
| Milling time: 15 minutes | 24,000 | 15 | Ti-1a |
| | 16,000 | 15 | Ti-1b |
| | 12,000 | 15 | Ti-1c |

As shown in FIG. 2, the high shear mill 200 apparatus contains high shear milling device 100, having a milling head 101 comprising a stator 104 and enclosed rotor 102. Rotation of the rotor is driven by an electric motor 106 via driver a drive shaft (not shown in FIG. 2). The high shear milling device 100 is installed on a stable stand 120. The milling head is designed to be received within a container, in this case milling jar 210. The jar 210 includes a cover 212 to seal the precursor particulates and powder product within the jar 210. In use, a specified amount of a milling liquid (as specified in the respective example run), and the precursor particulates to be milled are placed in a jar. The total amount of the mixture is ideally less than half of the jar height to prevent over spilling during milling. The milling head 101 of the high shear mill device 100 is lowered to the milling jar 210, with the end of the rotor 102 being spaced 10 mm apart from the bottom of the milling jar 210. The high shear milling device 100 is then operated for a designated period, after which the device 100 is turned off and the the resulting slurry of milled particulates and milling liquid is removed from the jar 210 and dried for at least 10 hours in a vacuum oven at 110° C.

After being dried, the resulting powder is placed in a stack of sizing sieves (of a particle sizing sieve arrangement) which was mounted and vibrated on a vibrating table for 0.5 hour to separate the powder into the respective size fractions.

Results

The resulting particle size distribution of high shear milled powder is shown in Table 2.

TABLE 2

Particle size distributions of high shear milled Ti-1 powders at different milling speed

| | (Wt %) | | | |
|---|---|---|---|---|
| Particle size (μm) | As received Ti-1 (before milling) | Ti-1a (24000 rpm/ 15 mins) | Ti-1b (16000 rpm/ 15 mins) | Ti-1c (12000 rpm/ 15 mins) |
| >250 | 37 | 0 | 0.1 | 0.1 |
| 150-250 | 21 | 0.1 | 0.1 | 1.0 |
| 106-150 | 16 | 0.1 | 0.6 | 4.8 |
| 75-106 | 16 | 1.1 | 5.7 | 16.5 |
| 45-75 | 7 | 16.5 | 32.5 | 38.1 |
| 25-45 | 3 | 53.3 | 36.1 | 25.1 |
| <25 | 0 | 28.9 | 24.9 | 14.5 |

A comparison of the above resultant particle size distributions indicates that more fine powder is produced using higher milling speeds.

Example 2—High Shear Milling Results as a Function of Milling Time

High shear milling yields were examined as a function of milling time to determine the effect of mixing speed on particle size reduction and particle size distribution.

Method

A laboratory scale, bench top high shear milling apparatus 200 (as shown in FIG. 2) was used to mill 30 g batches of Ti particulates. The high shear milling conditions for the Ti-2 titanium powder experimental runs are provided below:
  Batch: 30 g Ti particulates (<8 mm)
  Milling liquid: Water, 360 g;
  Milling speed: 25,000 rpm;
  Milling time: for 15 (Ti-2a), 30 (Ti-2b) and 45 minutes (Ti-2c).

The same high shear milling device was used as described and operated in Example 1. After high shear milling, the resulting slurry of particles and milling liquid was dried for at least 10 hours in a vacuum oven at 110° C.

Results

The particle size distributions of Ti-2a, Ti-2b and Ti-2c experimental runs are shown in Table 3.

TABLE 3

Particle size distribution in wt % of high shear milled Ti-2 titanium powder for different milling time

| Specimen | >250 μm | 250-150 | 150-106 | 106-75 | 75-45 | 45-25 | <25 μm |
|---|---|---|---|---|---|---|---|
| Ti-2 (as-received) | 64.39 | 31.27 | 4.06 | 0.28 | 0.00 | 0.00 | 0.00 |
| Ti-2a | 0.74 | 33.86 | 29.14 | 15.70 | 9.14 | 3.74 | 7.69 |
| Ti-2b | 0.08 | 0.11 | 2.78 | 21.84 | 37.12 | 17.3 | 20.77 |
| Ti-2c | 0.29 | 0.33 | 0.45 | 5.72 | 30.58 | 27.77 | 34.87 |

It was identified from analysis of the particle size distribution of Ti-2 after high shear milling that the longer period of high shear milling was, the higher portion of fine particles was produced.

After 45 minutes of high shear milling, ~36 wt % of 106 to 45 μm and ~63 wt % of <45 μm powder were produced (total ~99 wt % of <106 μm).

Example 3—High Shear Milling Results as a Function of Circumferential Speed (Rotor Size)

High shear milling of titanium particulates was undertake at two different circumferential speeds (7.4 mm and 15 mm diameter rotors, 10 mm and 20 mm diameter stators respectively at 21,000 rpm, see FIGS. 1A and 1B and corresponding description above) to determine the effect of rotor and stator size on particle size reduction and particle size distribution.

Method

A laboratory scale, bench top high shear milling apparatus 200 (as shown in FIG. 2) was used to mill 50 g batches of Ti particulates. The high shear milling conditions for the Ti-3 titanium powder experimental runs are provided below:
  Batch: 50 g Ti particulates (<8 mm)
  Milling liquid: Isopropanol, 700 g;
  Milling speed: 25000 rpm;
  Rotor size:
    Ti-3a and Ti-3b: 7.5 mm diameter;
    Ti-3c and Ti-3d: 15 mm diameter;
  Milling time:
    Ti-3a and Ti-3c: 1 hour;
    Ti-3b and Ti-3d: 2 hours.

The same high shear milling device was used as described and operated in Example 1. In this case, the mixture of Ti powder and isopropanol was placed in a plastic milling jar. Milling was undertaken in a fume cupboard with compress air blown over the top of the container to disperse the alcohol fume. The mixer was also earthed.

After operating the high shear mill for the designated time (1 and 2 hours), the resulting slurry of particles and milling liquid was dried in a vacuum oven at 80° C. for at least 10 hours. The resulting dried powder was then placed in a sieve sizing apparatus, which was placed in a vibrating table for 0.5 hour to separate the powder into the respective size fractions.

Results

The results after sieving are shown in Table 4:

TABLE 4

Particle size distribution of high shear milled Ti-3 titanium particulates with different circumferential speeds (7.4 and 15 mm diameter rotors)

| | Wt % | | | | |
|---|---|---|---|---|---|
| | >300 μm | 300 >> 100 | 100 >> 32 | <32 μm | total |
| Ti-3a | 0.05 | 42.73 | 42.07 | 15.19 | 100.00 |
| Ti-3b | 0.08 | 11.05 | 68.31 | 20.64 | 100.00 |
| Ti-3c | 0.03 | 0.65 | 69.44 | 29.87 | 100.00 |
| Ti-3d | 0.01 | 0.36 | 51.74 | 47.89 | 100.00 |

The yield of the production of <32 μm Ti powder from coarse titanium particulates after high shear milling with a 7.5 mm diameter rotor was a half of that with 15 mm diameter rotor. This indicated that the high shear milling experimental run with higher circumferential speed produced more fine powder.

Example 4—High Shear Milling Results as a Function of Batch Amount

High shear milling yields were examined as a function of batch amount to determine the effect of mixing speed on particle size reduction and particle size distribution.

Method

A laboratory scale, bench top high shear milling apparatus 200 (as shown in FIG. 2) was used to mill two different batch sizes of Ti particulates. The milling conditions for the Ti-4 titanium powder experimental runs are provided below:

Batch:
  Ti-4a: 50 g Ti particulates (<8 mm);
  Ti-4b: 130 g Ti particulates (<8 mm);
Milling liquid: Isopropanol, 800 g;
Milling speed: 25,000 rpm;
Rotor size (cm): 15 mm diameter;
Number of high shear mixers used in a high shear milling: 2 each;
Milling time: 2 hours.

The milling process was same described in Example 3.

Results

The results after sieving are shown in Table 5:

TABLE 5

Particle size distribution of high shear milled Ti-4 titanium particulates.

| | Wt % | | | | |
|---|---|---|---|---|---|
| | >300 μm | 300 >> 100 | 100 >> 32 | <32 μm | Total |
| Ti-4a | 0.04 | 0.30 | 33.81 | 65.86 | 100.00 |
| Ti-4b | 0.03 | 0.42 | 50.16 | 49.39 | 100.00 |

The production yield of <32 μm Ti powder from milling a larger amount of Ti powder (130 g, Ti-4b) under the same milling conditions was significantly lower than that of Ti-4a. This indicates that milling batch size can affect the particle size distribution, and in particular smaller batches are preferred to larger batches for a desired production yield of specified particle size powder.

Example 5—Gap Distance Between Rotor and Inside Wall of the Stator

High shear milling yields were examined as a function of the gap distance between rotor and inside wall of the stator to determine the effect of the gap distance on particle size reduction and particle size distribution.

It was identified from various high shear milling of titanium particulates that the gap distance between the rotor and a stator is an important parameter to obtain high yields of fine powder. Therefore two different gap distances were examined, L1 and L2 (detailed below) where L1<L2.

Method

A laboratory scale, bench top high shear milling apparatus 200 (as shown in FIG. 2) was used to mill 30 g batches of Ti particulates. The milling conditions the Ti-5 titanium powder experimental runs are provided below:

Batch: 30 g Ti particulates (<8 mm)
Milling liquid: Water, 300 g;
Milling speed: 21000 rpm;
Rotor size (cm): 15.0 mm diameter;
Gap distance:
  Ti-5a: L1 (<1 mm);
  Ti-5b: L2 (<2 mm), L2>L1;
Milling time: 30 minutes.

The same high shear milling device was used as described and operated in Example 1. After milling, the resulting slurry of particles and milling liquid was dried and sieved as described in Example 1.

Results

Figure 3:
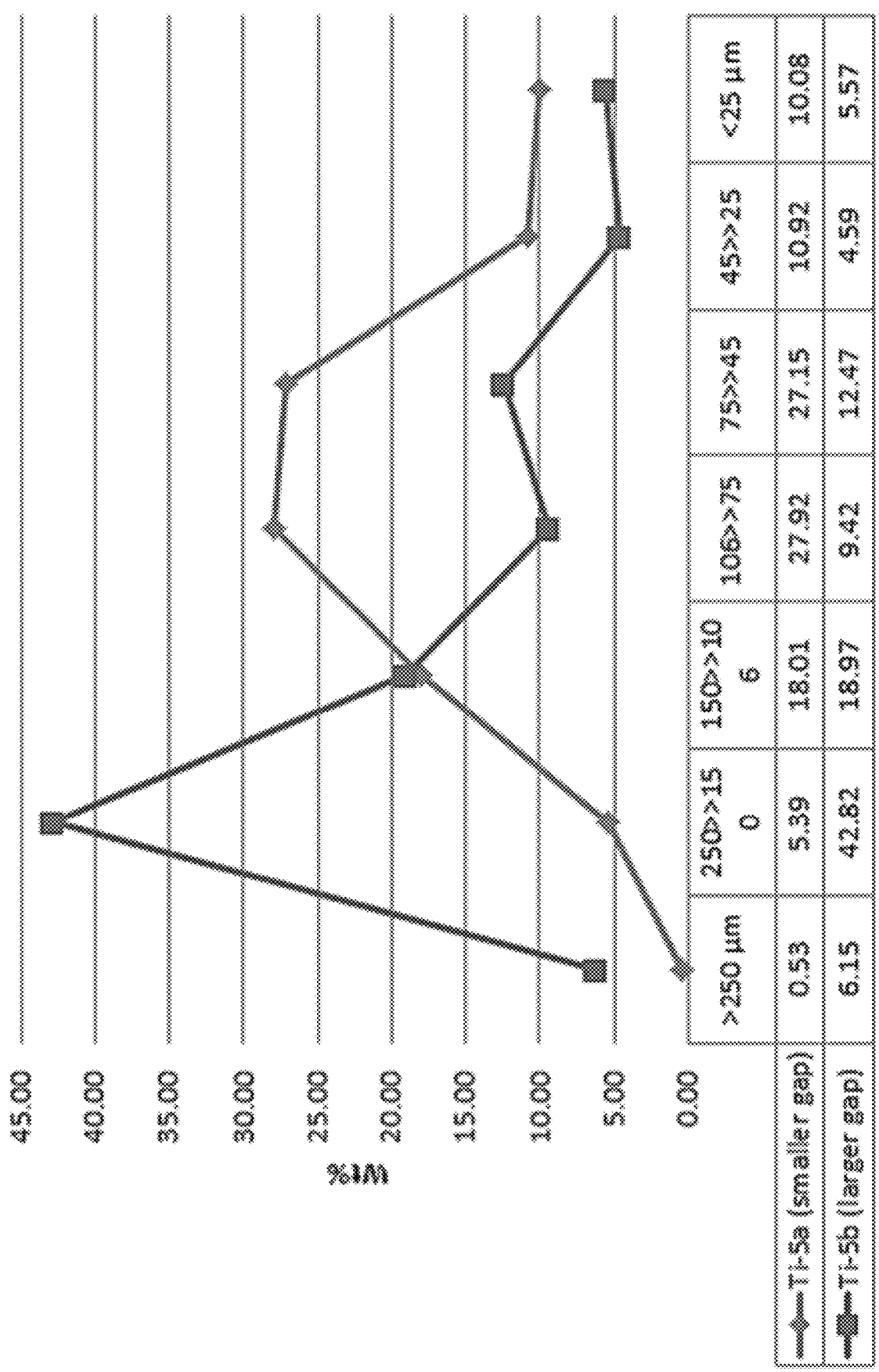
FIG. 3 illustrates the particle size distribution of high shear milled Ti-5 titanium powder as a function of gap distance between rotor and casing.

The result is shown in Table 6 and FIG. 3 which shows the particle size distribution of high shear milled Ti-5 titanium powder as a function of gap distance between rotor and casing As seen in Table 6 and FIG. 3, a small gap (Ti-5a) produced a lot more fine powder.

TABLE 6

Particle size distribution of HS milled Ti-5 powder with different gap distance

| Sample | >250 μm | 250-150 | 150-106 | 106-75 | 75-45 | 45-25 | <25 μm |
|---|---|---|---|---|---|---|---|
| Ti-5a | 0.5 wt % | 5.4 | 18.0 | 27.9 | 27.2 | 10.9 | 10.1 |
| Ti-5b | 6.2 wt % | 42.7 | 19.0 | 9.4 | 12.5 | 4.6 | 5.5 |

Example 6—Changes in Particle Morphology During High Shear Milling

The particle morphology of the powder product from the high shear milling process was examined to determine the effect of the high shear milling process on particle morphology.

Method

A laboratory scale, bench top high shear milling apparatus 200 (as shown in FIG. 2) was used to mill 30 g batches of Ti particulates. The high shear milling conditions for the Ti-6 titanium powder experimental runs are provided below:
- Batch: 30 g of Ti/Ti alloy sponge particulates (<8 mm)
- Milling liquid: Water, 360 g;
- Milling speed: 25,000 rpm;
- Milling time: 20 mins (Ti-6).

The same high shear milling device was used as described and operated in Example 1. After high shear milling, the resulting slurry of particles and milling liquid was dried for at least 10 hours in a vacuum oven at 110° C.

The morphology of the particulate before (T-6a) and after (T-6b) high shear milling was investigated using an optical microscope. The flowability, apparent density and tap density of the powder before and after high shear milling were also investigated using ASTM B8555-06, ASTM B703 and ASTM B527.

Results

FIGS. 4 and 5 show a comparison of the particle morphology before (T-6a) and after (T-6b) the high shear milling. As can be observed, the high shear milling process modified the morphology of the powder from an irregular shape to a spherical shape.

Powder morphology changes from irregular to spherical shapes after high shear milling are noticed in up to 45 micron size powder. Smaller than 45 micron powder which was high shear milled had angular shape morphology. This indicated that the critical mass of powder (to have enough impact energy to modify the surface of the particles) would an important factor to change their morphology to spherical shape during high shear milling in liquid, because morphology change of the powder would be caused by the collisions between powder particles, and the collisions between particle and rotor/stator during the milling process. Titanium powder which was high shear milled with higher milling speeds and longer milling times contain a higher proportion of spherical shape morphology.

Flowability measurements of two similar particle size range of titanium powders (before (as received) and after high shear milling) found that the flowability of the high shear milled titanium powder was increased from not flowable (as-received powders) to up to 23 seconds/20 cm$^3$. As a comparison, the flowability of commercial spherical shape Ti/Ti alloy powders (produced by gas atomisation method) for EBM was 21 seconds/20 cm$^3$. The apparent density and also tap density after high shear milling were also improved by more than 100% (e.g. apparent density: from 0.3 g/cm$^3$ to >0.6 g/cm$^3$, tap density: from 0.4 g/cm$^3$ to >0.9 g/cm$^3$).

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A method of producing an additive manufacturing and/or powder metallurgy powder from a metal or a metal alloy precursor particulate material comprising irregularly shaped particulate material, said method comprising:
    subjecting the metal or a metal alloy precursor particulate material to at least one high shear milling process comprising milling the material with at least one high shear mixer that includes a rotor configured to contact and comminute the precursor particulate material and a stator that extends substantially around the rotor, the stator being configured to have less than 1 mm gap between the rotor and an inner surface of the stator,
    thereby producing a metal or a metal alloy powder product having a reduced average particle size relative to the average particle size of the precursor particulate material and a particle morphology consisting essentially of spherically shaped particles.

2. A method according to claim 1, wherein the powder product has a particle size range determined by powder sieve analysis in which at least 90%, of the particles have an average particle size <300 μm.

3. A method according to claim 1, wherein the morphology of the powder product can be controlled by changing the shear milling process conditions including at least one of shear milling rotor speed; shear milling time; or amount of precursor powder.

4. A method according to claim 1, wherein the powder product has at least one of: high flowability of 23 to 35 seconds/20 cm$^3$ determined following ASTM B855-06; and low contamination of less than 1%.

5. A method according to claim 1, wherein the flowability of the powder product determined following ASTM B855-06 is between 20 and 23 seconds/20 cm$^3$.

6. A method according to claim 1, wherein the apparent/tap density of the powder product is improved at least by 100% after high shear milling.

7. A method according to claim 1, wherein the precursor particulate material comprises a coarse particulate material.

8. A method according to claim 1, wherein the precursor particulate material comprises Ti or Ti alloy particulate material.

9. A method according to claim 1, wherein the precursor particulate material is subjected to at least one pre-processing step comprising at least one comminution processes.

10. A method according to claim 1, wherein in the high shear milling process, the precursor particulate material is immersed in a liquid.

11. A method according to claim 10, wherein the liquid comprises at least one of water, alcohol or kerosene.

12. A method according to claim 1, wherein the rotor has a rotor diameter, and wherein the precursor particulate material comprises particles having an average particle size of less than the rotor diameter.

13. A method according to claim 1, wherein the at least one high shear mixer has a circumferential milling speed of at least 700 m/min.

14. A method according to claim 1, wherein the precursor particulate material comprises porous Ti/Ti alloy particulates and high shear milling is conducted for a duration of at least 15 minutes to produce maximum amount of powder product in the 45-106 μm particle size range.

15. A method according to claim 1, wherein the stator is configured to have less than 0.8 mm gap between the rotor and the inner surface of the stator.

16. A method according to claim 1, wherein the stator is configured to have from 0.2 and 0.8 mm gap between the rotor and the inner surface of the stator.

17. A method according to claim 1, wherein the precursor particulate material is subjected to milling with at least two high shear mills.

* * * * *